United States Patent [19]
Harrow

[11] Patent Number: 4,549,422
[45] Date of Patent: Oct. 29, 1985

[54] CUP AND ROLL MACHINE

[76] Inventor: Donald A. Harrow, 8427 Delphi Rd. SW., Olympia, Wash. 98502

[21] Appl. No.: 490,169

[22] Filed: Apr. 29, 1983

[51] Int. Cl.[4] .................. B21D 21/00; B21D 1/02; B21D 5/14; B21D 28/00
[52] U.S. Cl. .................................... 72/131; 72/171; 72/183; 72/332; 72/464
[58] Field of Search ................. 72/51, 129, 130, 131, 72/132, 171, 183, 294, 326, 331, 464, 324, 325, 332, 334, 338, 379

[56] References Cited
U.S. PATENT DOCUMENTS

| | | | |
|---|---|---|---|
| 267,627 | 11/1882 | Wiley . | |
| 378,707 | 2/1888 | Miller et al. . | |
| 410,723 | 9/1889 | Wiesing . | |
| 468,586 | 2/1892 | Walsh | 72/331 |
| 1,719,250 | 7/1929 | Walstrom | 72/129 |
| 1,771,955 | 7/1930 | Fork et al. . | |
| 1,793,352 | 2/1931 | Bell | 72/132 X |
| 2,096,387 | 10/1937 | Tinnerman | 72/331 |
| 2,111,574 | 3/1938 | Solenberger | 72/132 |
| 2,355,985 | 8/1944 | MacFarland | 93/81 |
| 2,387,688 | 10/1945 | Spahr | 153/55 |
| 2,753,918 | 7/1956 | Bradfield | 72/379 X |
| 2,776,694 | 1/1957 | Blomgren | 72/294 X |
| 2,783,817 | 3/1957 | Leroy | 72/183 X |
| 2,995,171 | 8/1961 | Hausler | 153/54 |
| 3,187,530 | 6/1965 | Ranney | 72/183 X |
| 3,832,876 | 9/1974 | Arens | 72/130 X |
| 3,994,656 | 11/1976 | Van Ausdall | 425/391 |
| 4,047,416 | 9/1977 | Johnson | 72/183 |
| 4,082,935 | 4/1978 | Lampietti et al. | 29/159.1 X |
| 4,304,114 | 12/1981 | Wiig | 72/130 |

FOREIGN PATENT DOCUMENTS

| | | | |
|---|---|---|---|
| 916472 | 1/1963 | United Kingdom | 72/294 |
| 476913 | 7/1975 | U.S.S.R. | 72/183 |

OTHER PUBLICATIONS
Flyer from Howard C. Forrest Company.
Pexto Instructions and Parts Identification pp. 1-5, by Roper Whitney, Inc.

*Primary Examiner*—E. Michael Combs
*Attorney, Agent, or Firm*—Joan H. Pauly; Delbert J. Barnard

[57] ABSTRACT

A roll (10) of metal lagging is loaded onto a loading rack (14). One end of lagging (8) is drawn upwardly and away from roll (10) by a feed drive roller (38) paired with a pressure roller (36). Before it reaches these rollers (36, 38), lagging (8) is pulled upwardly between a guide roller (28) and a pressure roller (26). The axis of roller (26) is slightly below the axis of roller (28). Lagging (8) is drawn between rollers (26, 28) and around roller (28) to drive roller (38). Drive roller (38) moves lagging (8) past a cutting station into engagement with two drive rollers (86, 88) of a curling mechanism (84). When a predetermined amount of lagging (8) has passed the cutting station, drive motor (104) stops and a movable blade (46) moves downwardly past a stationary blade (48) to cut lagging (8). A pressure foot (54) moves downwardly with blade (46) and in cooperation with a guide block (58) forms a bend (6) on lagging (8) just before it is cut. Curling mechanism (84) forms the cut piece of lagging (8) into a desired diameter. The rotation of the three drive rollers (38, 86, 88) is synchronized for smooth feeding of the lagging (8) from drive roller (38) into curling mechanism (84). Machine (2) may be operated entirely automatically to produce a desired quantity of pieces (4) of a desired length.

7 Claims, 11 Drawing Figures

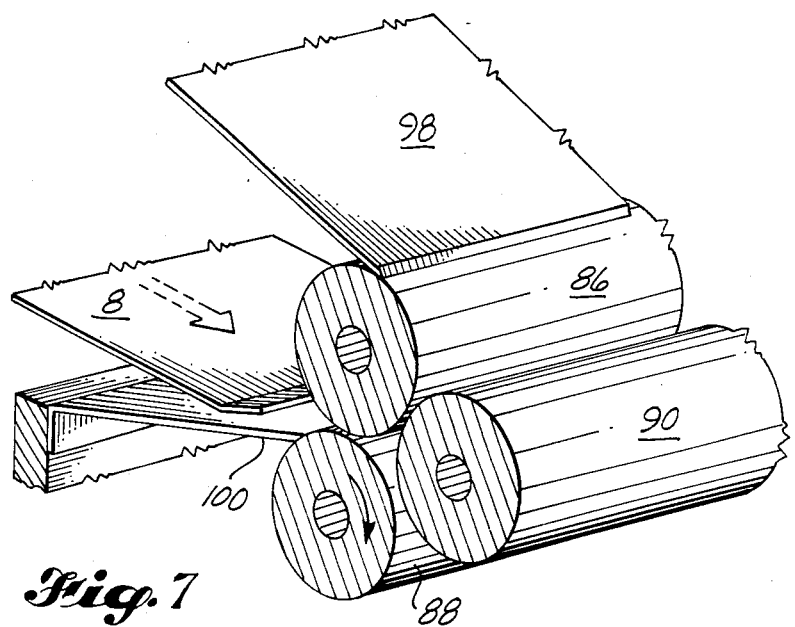
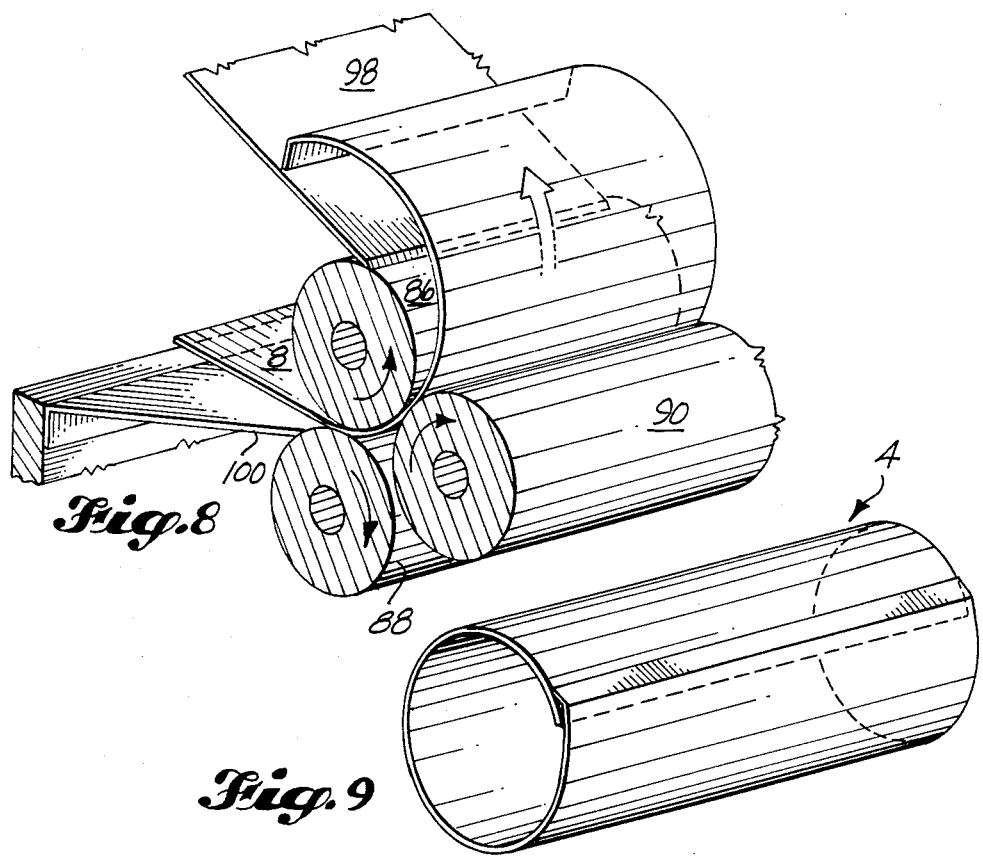

CUP AND ROLL MACHINE

DESCRIPTION

1. Technical Field

This invention relates to machines for cutting and rolling sheet material such as metal lagging and, more particularly, to such a machine that automatically feeds material from a roll to the machine, removes memory in the material of the curvature of the roll, cuts the material, forms a bend on the end of the material, and rolls the material into a cylinder.

2. Background Art

This invention is directed primarily toward providing a single machine for processing rolls of metal lagging direct from the factory and producing a finished product ready to be placed around insulated pipes in industrial installations such as power plants. There are known machines for performing one or more, but not all, of the steps necessary to fully process a roll of lagging but there is no previous machine known to the applicant that automatically performs all of the necessary steps. The currently available machines known to the applicant have the disadvantages, in addition to not performing all of the necessary functions, of being relatively large and inefficient and not sufficiently accurate. The machines currently in use are also fairly expensive to operate in part because they require a good deal of human labor to accomplish the complete processing of the lagging. An example of a known machine currently available for cutting and rolling metal lagging is Model No. 648 "Powered Shear and Rolls Former" manufactured by Howard C. Forrest Company of Houston, Tex.

The following U.S. Patents disclose machines for cutting and rolling sheet material;

U.S. Pat. No. 267,627 granted Nov. 14, 1882, to C. D. Wiley;
U.S. Pat. No. 1,771,955, granted July 29, 1930, to W. C. Fork et al;
U.S. Pat. No. 2,355,985, granted Aug. 15, 1944, to A. M. MacFarland;
U.S. Pat. No. 3,994,656, granted Nov. 30, 1976, to J. G. Van Ausdall; and
U.S. Pat. No. 4,304,114, granted Dec. 8, 1981, to C. M. Wiig.

Machines for rolling sheet material are disclosed by the following U.S. Pats.:

U.S. Pat. No. 378,707, granted Feb. 28, 1888, to J. B. Miller et al;
U.S. Pat. No. 2,387,688, granted Oct. 23, 1945, to W. F. Spahr; and
U.S. Pat. No. 2,995,171, granted Aug. 8, 1961, to C. Hausler.

U.S. Pat. No. 410,723, granted Sept. 10, 1889, to C. H. Wiesing, discloses a punch device for forming slots in metal pipes. The punch has an angled surface that is forced down against a portion of the pipe to cut an oblong piece of the pipe on all but one side and bend the piece inward to form a slot.

The above patents and the prior art that is discussed and/or cited therein should be studied for the purpose of putting the present invention into proper perspective relative to the prior art.

DISCLOSURE OF THE INVENTION

A subject of the invention is apparatus for forming sheet metal sleeves. According to an aspect of the invention, the apparatus comprises feed means, cutting means, and roll forming means, in series. The cutting means comprises a vertically movable cutter blade. The roll forming means includes a plurality of rollers forming a nip into which sheet metal to be formed is received. The feed means is adapted to pull sheet metal from a roll and feed it below the cutter blade when the blade is in a raised position, directly to and into the nip of the roll forming rollers. The apparatus also includes means for coordinating operation of the feed means, the cutting means, and the roll forming means, driving the feed means and the roll forming means together when the cutter blade is raised, and stopping the feed means and the roll forming means together while lowering the cutter blade.

According to another aspect of the invention, the apparatus comprises feed means, edge forming and cutting means, and roll forming means, in series. The edge forming and cutting means comprises a vertically movable cutter blade and a vertically movable first forming member adjacent to said blade. The roll forming means includes a plurality of rollers forming a nip into which sheet metal to be formed is received. The feed means is adapted to pull sheet metal from a roll and feed it below the cutter blade and first forming member when they are in a raised position, to and into the nip of the roll forming rollers. The edge forming and cutting means further comprises a fixed second forming member so positioned that when the first forming member and the cutter blade are lowered the first and second forming members will crease the sheet metal and then the cutter blade will cut the sheet metal along a line close to the crease.

According to another aspect of the invention, the apparatus comprises feed means, edge forming and cutting means, and roll forming means, in series. The edge forming and cutting means comprises a vertically movable cutter blade and a vertically movable first forming member adjacent to the blade. The roll forming means includes a plurality of rollers forming a nip into which sheet metal to be formed is received. The feed means is adapted to pull sheet metal from a roll and feed it below the cutter blade and first forming member when they are in a raised position, directly to and into the nip of the roll forming rollers. The edge forming and cutting means further comprises a fixed second forming member so positioned that when the first forming member and the cutter blade are lowered the first and second forming members will crease the sheet metal and then the cutter blade will cut the sheet metal along a line close to the crease. The apparatus also includes means for coordinating operation of the feed means, the edge forming and cutting means, and the roll forming means, driving the feed means and the roll forming means together when the cutter blade and first forming member are raised, and stopping the feed means and the roll forming means together while lowering the first forming member and the cutter blade. Preferably, the feed means includes straightening means for rolling the sheet metal in a direction opposite to the curvature of the roll to remove member of the curvature of the roll.

According to still another aspect of the inventin, the edge forming and cutting means further comprises a stationary cutter blade and a frame member to support the stationary blade. Each blade has a cutting edge and the cutting edges cooperate to cut the sheet metal. The first forming member comprises a pressure foot slidingly attached to the movable cutter blade to reciprocate with the movable cutter blade. The second forming member comprises a guide block mounted on said frame member and positioned generally parallel to and laterally spaced from the cutting edges of the blades.

According to yet another aspect of the invention, the means for coordinating comprises drive means that synchronizes the feed means and the roll forming means to ensure smooth feeding of the sheet metal into said nip by the feed means.

Another subject of the invention is apparatus for cutting sheet metal into pieces of predetermined length and rolling the pieces into cylindrical shapes. According to an aspect of the invention, the apparatus comprises straightening and feed means, cutting means, and cylinder forming means, in series. The cutting means comprises a vertically movable cutter blade. The cylinder forming means includes a plurality of rollers forming a nip into which sheet metal to be formed is received. The straightening and feed means is adapted to pull sheet metal from a roll, roll the sheet metal in a direction opposite to the curvature of the roll to remove memory of the curvature of the roll, and feed the sheet metal below the cutter blade when the blade is in a raised position, directly to and into the nip of the cylinder forming rollers. The apparatus also includes means for coordinating operation of the straightening and feed means, cutting means, and cylinder forming means, driving the straightening and feed means and the cylinder forming means together when the cutter blade is raised, and stopping the straightening and feed means and cylinder forming means together while lowering the cutter blade.

Another aspect of the invention is apparatus for cutting sheet metal or the like into pieces of predetermined length and rolling each piece into a cylindrical shape of predetermined diameter. According to an aspect of the invention, the apparatus comprises a frame, and cutting means supported by the frame and including a movable blade. A loading rack is attached to the infeed end of the frame for supporting a roll of uncut sheet metal. Feed means feeds one end of the roll past the cutting means. The feed means comprises a pair of rollers including a drive roller and a pressure roller. On the infeed side of the cutting means is positioned means for straightening said end of the roll to remove memory of the curvature of the roll. Curling means is provided for rolling the sheet metal into a cylindrical shape of said predetermined diameter. The curling means includes drive roller means for moving the sheet metal through the curling means. The curling means is supported on the frame on the outfeed side of the cutting means. Guide means guides each piece of the sheet metal into engagement with the drive roller means. Drive means drives the drive roller of the feed means and the drive roller means of the curling means and coordinates the movement of the drive roller and the drive roller means. Shear means is provided for moving the cutting blade to cut the sheet metal and returning the blade to its initial position. Measuring means determines when a sufficient length of sheet metal has moved past the cutting edge of the cutting blade to provide a piece of sheet metal of a desired predetermined length. Stop means stops the drive means and movement of the drive roller and drive roller means and activates the shear means in response to a signal from the measuring means. Restart means is activated by the return of the cutting blade to its initial position for restarting the drive means and resuming movement of the drive roller and drive roller means.

Another subject of the invention is an improvement in apparatus for cutting metal lagging or the like into pieces of predetermined length, said apparatus being of the type having a stationary blade, a movable blade, two cutting edges, one on each blade, that cooperate to cut the lagging, and a frame member to support the stationary blade. According to an aspect of the invention the improvement comprises a pressure foot slidingly attached to the movable blade to reciprocate with the movable blade, and a guide block mounted on said frame member and positioned generally parallel to and laterally spaced from the cutting edges of the blades. Means is provided for reciprocating the movable blade and the pressure foot to first bring the pressure foot into contact with the lagging to urge the lagging against a surface of the guide block and the stationary blade adjacent to the cutting edge of the stationary blade to form the lagging into a desired shape, and then to move the cutting edge of the movable blade into contact with the lagging to cut the lagging. The shapes of the portions of the pressure foot and the guide block contacting the lagging when the pressure foot is so urged conform to said desired shape of the lagging.

Still another subject of the invention is an improvement in apparatus having cutting means for cutting sheet metal or the like into pieces of predetermined length and a frame for supporting the cutting means. According to an aspect of the invention, the improvement comprises a loading rack, a first pair of feed rollers, biasing means, a second pair of feed rollers, and means for guiding the sheet metal into position to be cut by the cutting means. The loading rack is attached to a lower portion of the infeed end of the frame for supporting a roll of uncut sheet metal. The first pair of feed rollers is supported on the infeed end of the frame above and on the outfeed side of the roll of sheet metal. The first pair of rollers includes a pressure roller and a guide roller positioned on the outfeed side of the pressure roller with the axis of the pressure roller being slightly below the axis of the guide roller. The biasing means biases the pressure roller toward the guide roller. The second pair of feed rollers is supported on the frame on the outfeed side of the first pair of rollers and is positioned to have lines of contact with the sheet metal that are below the uppermost portion of the guide roller of the first pair of rollers.

Yet another subject of the invention is an improvement in apparatus having cutting means and rolling means for cutting and rolling sheet metal or the like, said cutting means having a cutting station, and said rolling means having engaging means for moving the sheet metal therethrough. According to an aspect of the invention, the improvement comprises feed drive means and synchronizing means. The feed drive means moves the sheet metal past the cutting station of the cutting means and directly into engagement with the engaging means of the rolling means. The synchronizing means drives the feed drive means and the engaging means in synchronization with each other to ensure the smooth feeding of the sheet metal by the feed drive means into the engaging means.

It should be obvious that machines constructed according to the invention offer considerable advantages over known machines. The advantages of the various aspects of the invention are set forth in detail in the description of the best mode for carrying out the invention that follows. In addition, the various features of the invention described above and other features of the invention will become apparent from the following detailed description of the best mode for carrying out the invention.

BRIEF DESCRIPTION OF THE DRAWINGS

In the drawings, like element designations refer to like parts throughout, and:

FIGS. 7 and 8 are pictorial views of the rollers of the curling mechanism of the machine shown in FIGS. 1–3.

FIG. 9 is a pictorial view of a finished piece of lagging.

FIG. 10 is a front elevational view of the control box of the preferred embodiment.

BEST MODE FOR CARRYING OUT THE INVENTION

Figure 1:
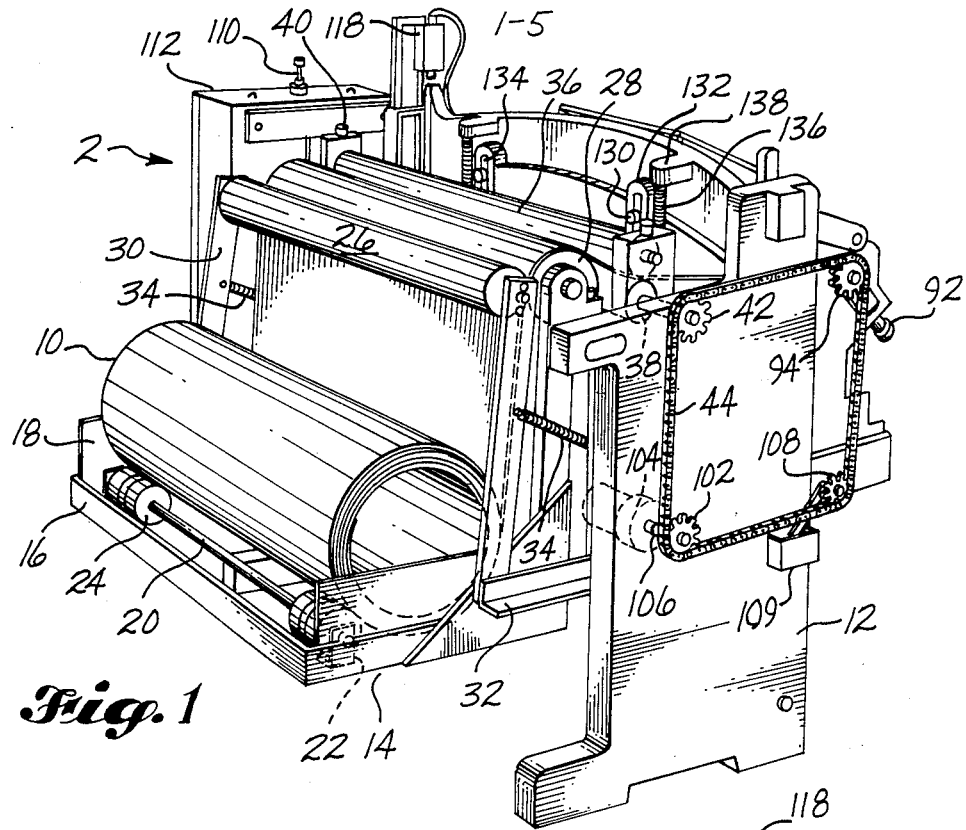
FIG. 1 is a pictorial view of the infeed end and one side of the preferred embodiment, showing the cutting apparatus in a down position.

The drawings show a machine 2 that is constructed according to the invention and that constitutes the best mode of the invention currently known to the applicant. The anticipated primary use for the machine 2 is to cut and roll metal lagging of the type used to form a metal jacket around insulated pipes in power plant installations. The machine 2 cuts the lagging into pieces of predetermined length and rolls each piece into a cylindrical shape 4 of predetermined diameter. As each piece is being cut, the outfeed end of the next piece is being bent to form a "hug" edge 6. When the piece of lagging 4 is placed around an insulated pipe, the bent hug edge 6 overlaps the other edge of the piece 4. When suitable fasteners such as metal band fasteners are placed around the metal jacket 4 to secure it in place and urge the hug edge 6 against the other edge of the jacket, which it overlaps, the hug edge 6 sealingly engages the other edge of the jacket so that the lagging will sealingly surround the insulated pipe. This helps insure that the pipe and its insulation are protected from contaminants and the environment.

Figure 3:
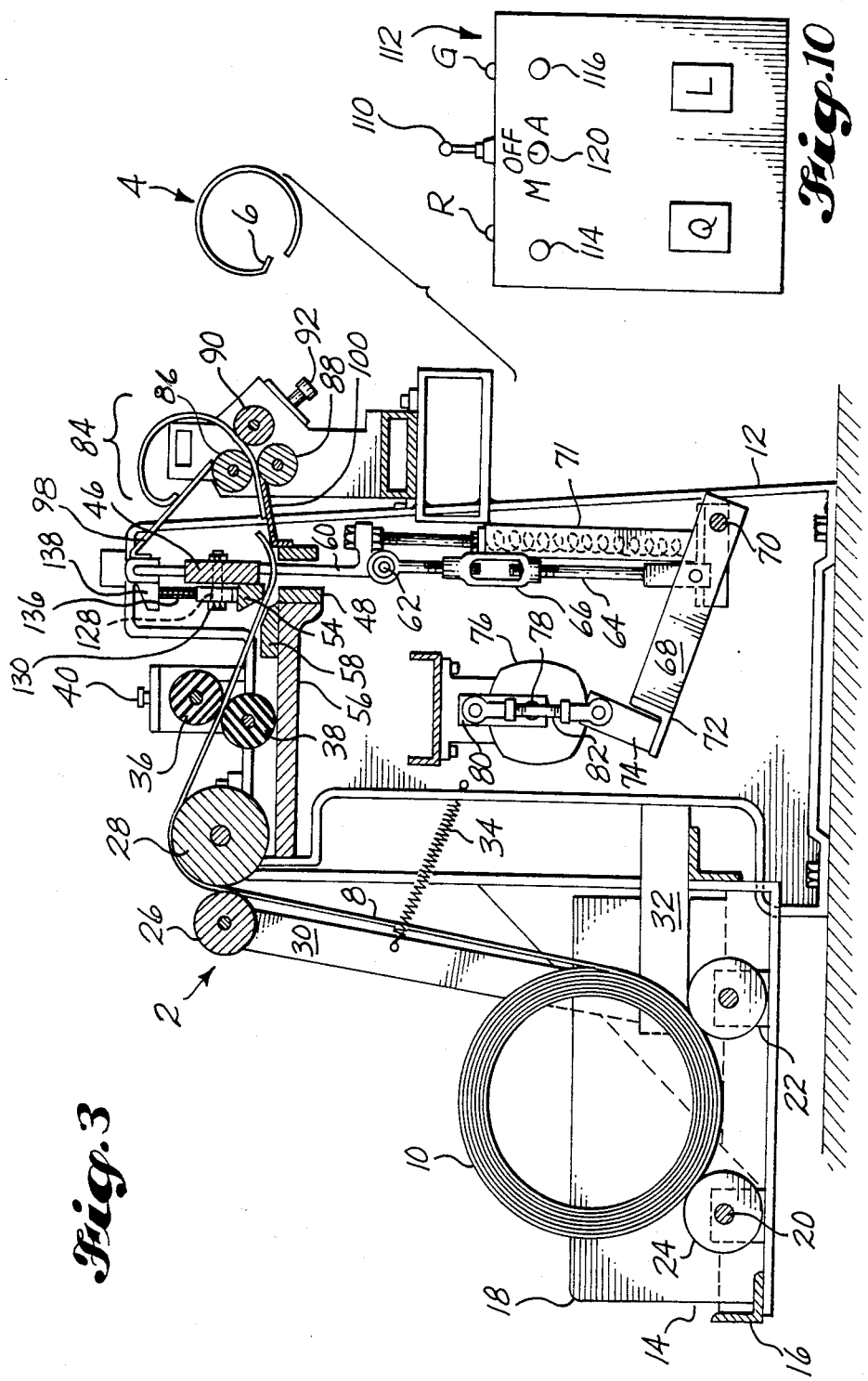
FIG. 3 is a vertical sectional view of the machine shown in FIGS. 1 and 2.

The preferred embodiment of the invention includes a frame 12 with an infeed end at which metal lagging 8 from a roll 10 is fed into the machine 2 and an opposite outfeed end from which the finished pieces 4 of cut and rolled lagging leave the machine 2. A loading rack 14 is attached to the infeed end of the frame 2 and projects horizontally outwardly therefrom. The rack 14 includes a base 16 and two vertical side members 18 for limiting lateral movement of a roll of lagging. Two laterally extending shafts 20 are journaled in suitable openings in four angle irons 22 attached to the side plates 18 and base 16 of the rack 14. Mounted on each shaft 20 adjacent to each of its journaled ends is an idler wheel 24 (preferably made from an elastomeric material). One of the shafts 20 is positioned near the infeed end of the rack 14 and the other shaft 20 is positioned near the outfeed end. When a roll 10 of lagging 8 is placed in the rack 14, the roll 10 rests on the four idler wheels as shown in FIGS. 1 and 3 and easily rolls on the idler wheels 24 as lagging 8 is pulled from the roll 10 through the machine 2 (as shown in FIG. 3).

The lagging 8 is fed and guided to the cutting apparatus of the machine 2 from the loading rack 14 by two sets of rollers. The first set of rollers 26, 28 is positioned at about the top of the infeed end of the frame 12 above the loading rack 14 and on the outfeed side of the roll 10 of lagging 8. The two rollers 26, 28 of this first pair are positioned approximately horizontally adjacent to each other with the axis of the roller 26 on the infeed side of the pair 26, 28 being slightly below the axis of roller 28 (in the order of ½" lower). Roller 28 is a guide roller and roller 26 is a pressure roller. Roller 28 is journaled on a portion of the frame 12 in the conventional manner and roller 26 is journaled on the upper ends of two pivot bars 30. The lower ends of the pivot bars 30 are pivotally attached to horizontally projecting frame members 32. A spring 34 biases each pivot bar 30 toward the machine 2 to bias the pressure roller 26 toward the guide roller 28 and urge lagging 8 moving between the two rollers 26, 28 into contact with the guide roller 28. The lagging 8 is fed upwardly from the roll 10 between the guide and pressure rollers 26, 28 up and around the guide roller 28 and downwardly into a second pair of rollers 36, 38. The arrangement of the guide and pressure rollers 26, 28 and their relative positioning to the second pair of rollers 36, 38 function to straighten the lagging 8 to remove memory of the curvature of the roll 10 and to control movement of the lagging 8 to prevent lateral and longitudinal wandering of the lagging 8 as it is being fed into the machine 2.

The second pair of rollers 36, 38 is a conventional arrangement of a drive roller 38 and a pressure roller 36. The second pair of rollers 36, 38 is supported on the frame 12 on the outfeed side of the first pair of rollers 26, 28. The two rollers 36, 38 of the second pair are positioned to have lines of contact with the lagging 8 that are below the uppermost portion of the guide roller 28 of the first pair of rollers 26, 28. This arrangement increases the circumferential extent of the contact between the lagging 8 and the guide roller 28 as the lagging 8 moves through the machine 2.

The second pair of rollers 36, 38 includes an upper pressure roller 36 and a lower drive roller 38. The pressure and drive rollers 36, 38 are arranged in the conventional manner with the axis of the two rollers 36, 38 in the same plane as their lines of contact with the lagging 8. The pressure roller 36 is journaled in suitable openings in the frame 12 and the amount of pressure it puts on lagging 8 between the two rollers 36, 38 may be adjusted by adjusting the position of its axis by turning adjustment screws 40. Such adjustments may be made to accommodate different thicknesses of lagging but the adjustments are generally unnecessary since the rollers 36, 38 are made from an elastomeric material with sufficient elasticity to accommodate a range of thicknesses of lagging. The shaft of the drive roller 38 is journaled at one end in a suitable opening in the side of the frame 12 of the machine 2 and extends at its other end through the frame 12. This other end extending outwardly from the frame 12 has a sprocket wheel 42 attached to its projecting end which sprocket wheel 42 engages a drive chain 44.

The drive roller 38 moves the lagging 8 past the cutting station of the cutting apparatus. When the desired length of lagging 8 has moved past the cutting station, the motion of the drive wheel 38 is stopped and the cutting operation is carried out.

The cutting apparatus includes a movable upper blade 46 and a stationary lower blade 48. The upper blade 46 moves vertically up and down and is positioned so that its cutting edge 50 is spaced horizontally from the cutting edge 52 of the lower blade 48 a distance in the order of 0.004 of an inch. The cutting apparatus also includes a pressure foot 54 that moves up and down with the movable blade 46. The pressure foot 54 extends horizontally across the width of the machine from one side of the frame 12 to the other, parallel and adjacent to the movable blade 46. The preferred cross sectional shape of the pressure foot 54 is shown in FIGS. 3-6 and is trapezoidal with parallel upper and lower horizontal surfaces, a vertical side surface adjacent to the movable cutting blade 46, and an angled opposite side surface that slants toward the cutting blade 46 from the top surface to the bottom surface.

The pressure foot 54 is mechanically linked to the upper blade 46 to move up and down with the upper blade 46 and slide vertically with respect to said blade 46. The mechanical connection includes two horizontally spaced rods 128 that are rigidly attached to and project horizontally from the upper blade 46. Each of these rods 128 is slidingly received into a vertical slot 134 in a mounting lug 132 that projects upwardly from the top of the pressure foot 54. A bolt 130 is secured to the outer end of each rod, and each mounting lug 132 is kept spaced from the movable blade 46 to maintain sufficient horizontal space between the pressure foot 54 and the movable blade 46 to insure that the pressure foot 54 will clear the cutting edge of the stationary blade 48. Two coil springs 136 bias the pressure foot 54 downwardly. The top of each spring 136 is attached to a horizontally projecting frame member 138, and is bottom is attached to an upper portion of the pressure foot 54.

Figure 4:
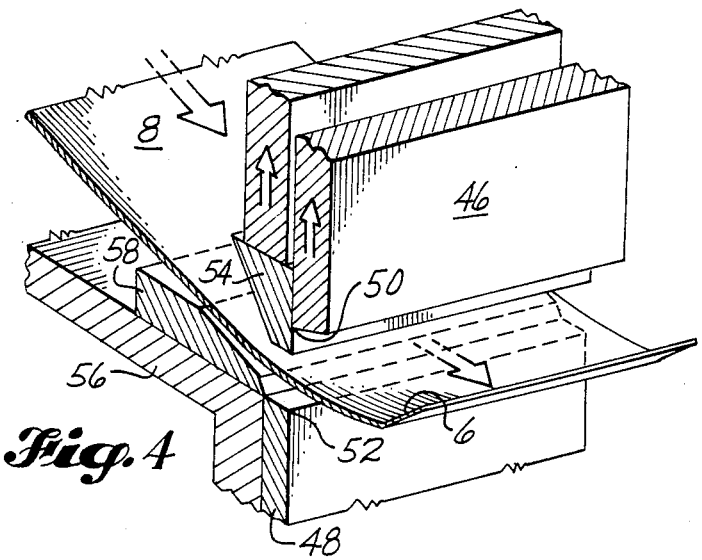
FIGS. 4–6 are fragmentary pictorial views showing the cutting apparatus and surrounding structure of the machine shown in FIGS. 1–3.
Figure 5:
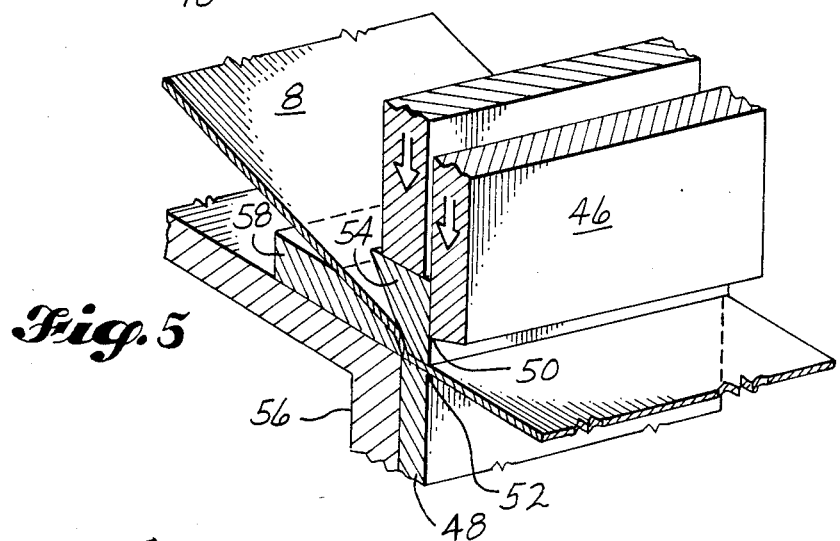

When the movable blade 46 and the pressure foot 54 are at rest in their upper positions, the springs 136 bias the foot 54 downwardly so that the rods 128 contact the tops of the slots 134. (See FIG. 3) When the shear motor 104 is started and blade 46 moves downwardly, springs 136 cause pressure foot 54 to move downwardly with blade 46 (FIG. 4) and rods 128 stay in contact with the tops of slots 134. The downward motion of pressure foot 54 is stopped by contact between foot 54 and the top of stationary blade 48 (FIG. 5). Blade 46 continues to move downwardly to cut the lagging 8 (FIG. 6), and at the same time rods 128 slide downwardly in slots 134. The cutting apparatus is adjusted so that rods 128 never contact the bottoms of slots 134 since each contact could damage the machine 2. As blade 46 reciprocates back up toward its initial position, rods 128 slide upwardly in slots 134 and engage the tops of slots 134 to move pressure foot 54 back up to its initial position.

Figure 6:
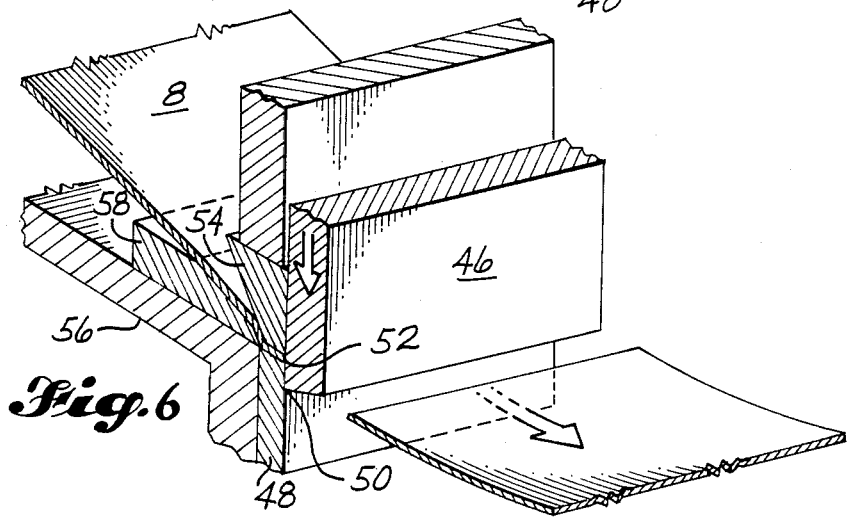
Figure 11:
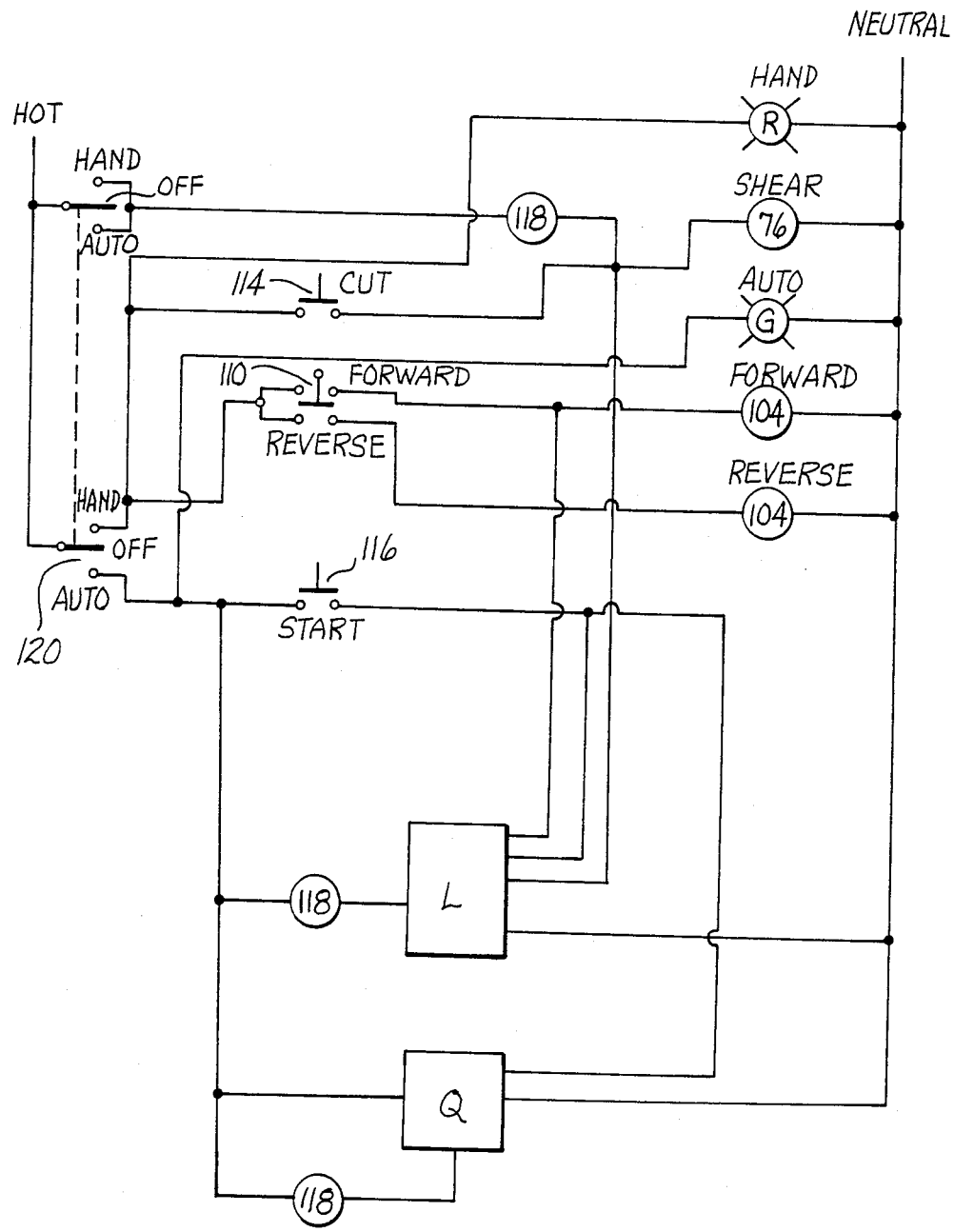
FIG. 11 is a simplified circuit diagram of the electrical control system of the preferred embodiment.

The lower cutting blade 48 is securely attached to a vertical side of an angled frame member 56 and its top surface is essentially flush with the top surface of the frame member 56. A guide block 58 is attached to the top of the frame member 56 with its outfeed lower edge adjacent to the infeed upper edge of the lower blade 48. The shape of the guide block 58 is best shown in FIGS. 4-6. As can be seen in FIGS. 4-6, the guide block 58 cooperates with the pressure foot 54 to form the hug edge 6 on the lagging 8. The length of the guide block from its infeed end to its outfeed end is longer than is necessary to form the hug edge 6 so that the guide block 58 will perform the additional function of guiding the lagging 8 from the second set of rollers 36, 38 between the two cutting blades 46, 48.

The movable cutting blade 46 is carried on two reciprocating side frame members 60 to the bottom of each of which is attached a shaft 64. The shaft 64 is pivotally attached to the frame member 60 by a pin 62 and includes an upper portion, a lower portion, and a turnbuckle 66 connecting the upper and lower portions. The lower end of the shaft is pivotally connected to a lever 68 that extends at an angle to the horizontal parallel and adjacent to one side of the frame 12. The outfeed end of each of the two levers 68 is attached to a shaft 70 that extends horizontally across the machine 2 and is journaled in suitable openings in the sides of the frame 12. The two levers 68 are also attached to a transverse bar 72 extending between the two levers 68 on the infeed side of the shaft 70. A spring 71 is provided adjacent to each shaft 64 to assist the motor 76 (described below) in returning the blade 46 to its upper position. The arrangement of the two cutting blades 46, 48, the mechanical connection between the movable cutting blade 46 and the pressure foot 54, and the mechanism for reciprocating the movable blade 46 up and down described above are all well-known in the art and are of the type manufactured by Roper Whitney, Inc., of Rockford, Ill. under the trademark Pexto and with the Model Nos. 132, 137, 142, and 152. The shape of the pressure foot 54, the guide block 58, and the cooperation of the pressure foot 54 and guide block 58 to form the hug edge 6 described above and the means for activating the reciprocation of the movable blade 46 described below are novel features of the machine 2.

Figure 2:
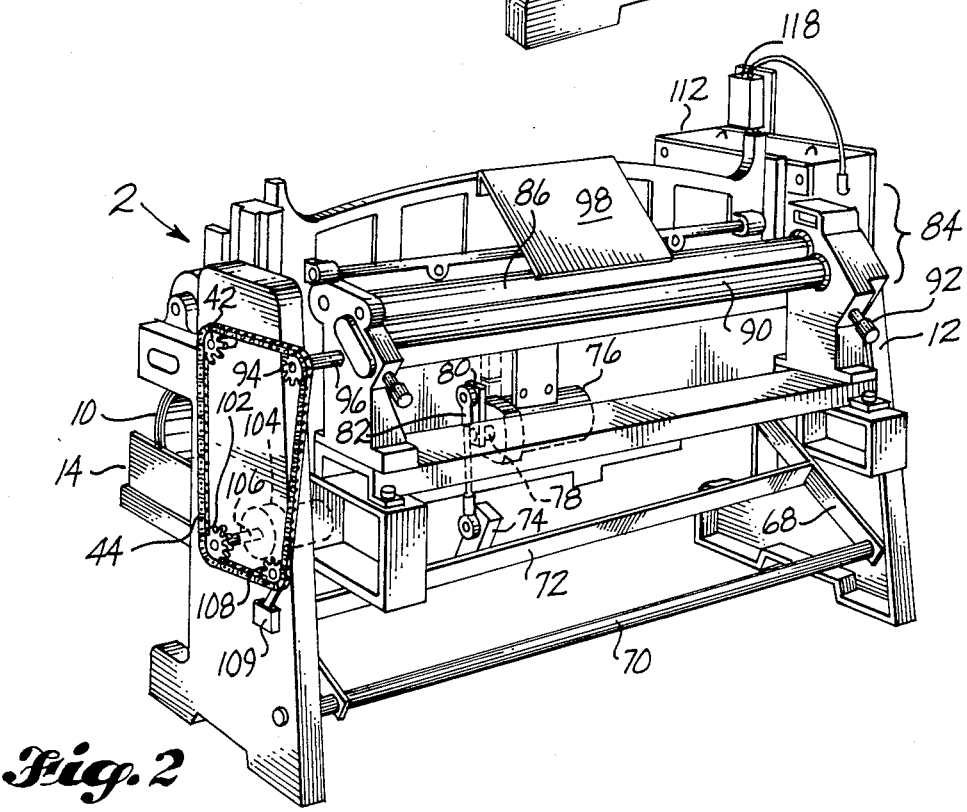
FIG. 2 is a pictorial view of the outfeed end and the same side of the machine shown in FIG. 1, but showing the cutting apparatus in an up position.

A link bar 74 is rigidly attached to and extends generally upwardly from a mid portion of the transverse bar 72. A one revolution motor 76 is carried by the frame 12 above the link bar 74. The shaft 78 of the motor 76 is nonrotatably attached to one end of a rectangular block 80. One end of a connecting shaft 82 is rotatably attached to the other end of the rectangular block 80 and the other end of the connecting shaft 82 is rotatably attached to the link bar 74. When the shear motor 76 is activated, the motor shaft 78 makes a single rotation to rotate the rectangular block 80 360°. As the block 80 rotates, the connecting shaft 82 moves downwardly and pivots with respect to the block 80 and the link bar 74 until one half of a revolution has been completed. During the second half of the revolution, the connecting shaft 82 continues to pivot with respect to the block 80 and bar 74 and moves upwardly back into its stop position shown in FIGS. 2 and 3. The downward and then upward movement of the shaft 82 pivots the transverse bar 72 downwardly and upwardly and thereby reciprocates the movable blade 46.

The motor 76 is provided with an electronically activated disc brake on its drive shaft 78 to stop the motor 76 essentially instantly when it has completed one revolution. This ensures the correct positioning of the movable blade 46. The brake is of the type manufactured by Dayton Electric Manufacturing Co. of Chicago, Ill., with Model No. 4Z447. The motor is of the type manufactured by the same company with Model No. 6K375.

The machine 2 also includes means for rolling each piece of lagging 8 into a cylindrical form of a predetermined diameter. (See FIGS. 7-9) This rolling means 84 is attached to the outfeed end of the machine 2. The preferred embodiment of the rolling means 84 consists of apparatus of the type manufactured by Roper Whitney, Inc. under the trademark Pexto and with the Model Nos. 0381, 381, 382, and 383. The apparatus 84 includes two drive rollers 86, 88 that rotate in opposite directions to draw the piece of lagging 8 between them in the conventional manner. On the outfeed side of the two drive rollers 86, 88 is positioned a third diameter-setting roller 90. This third roller 90 is urged against the upper drive roller 86 to press the lagging 8 between itself and the upper drive roller 86 to impart the desired curvature to the lagging 8. The position of the third roller 90 with respect to the drive rollers 86, 88, and therefore the diameter of the finished piece 4 of lagging, is adjustable by means of two adjustment screws 92.

The drive rollers 86, 88 are driven by the same drive chain 44 that drives the feed drive roller 38. The drive chain 44 is engaged by a sprocket 94 attached to the end of a drive shaft 96. The motion of the drive shaft 96 is converted into the rotation of the two drive rollers 86, 88 by a conventional gear mechanism that engages one end of the shaft of each drive roller 86, 88. The other end of each drive roller 86, 88 and the two ends of the third roller 90 are journaled in openings in the sides of the frame 12.

After the piece of lagging 8 has moved through the three roller configuration, the curvature imparted to the piece 4 generally causes it to move upwardly and back toward the machine 2. A plate 98 is provided for preventing the outfeed end of the piece 4 from rolling back into the three roller configuration and wrapping itself around the upper drive roller 86. The plate 98 has an upper end attached to a frame member and slopes downwardly in the outfeed direction to its outfeed end which rests on the upper drive roller 86.

Another guide plate 100 is positioned between the cutting blades 46, 48 and the rolling mechanism 84 to guide the lagging 8 from the cutting station into engagement with the two drive rollers 86, 88. The positioning of the drive rollers 86, 88 with respect to the cutting station is such that the outfeed end of the lagging 8 is engaged by the drive rollers 86, 88 before the cutting operation is carried out so that there is no need for any drive rollers other than the drive feed roller 38 and the two drive rollers 86, 88 of the rolling mechanism 84.

The three drive rollers 38, 86, 88 of the machine 2 are driven by a single drive chain 44 to synchronize the rotation of the feed drive roller 38 and the drive rollers 86, 88 of the rolling mechanism 84 to prevent fouling of the machine 2 and to permit the smooth feeding of the lagging 8 by the feed drive roller 38 into engagement with the drive rollers 86, 88. The drive chain 44 is most clearly shown in FIGS. 1 and 2. The chain 44 has a generally rectangular configuration with four sprockets 42, 94, 102, 108 at each of its corners. The lower infeed side sprocket 102 is connected to the end of the drive shaft 106 of a motor 104. The motor 104 is of the type manufactured by Dayton Electric Manufacturing Co., with Model No. 6K351. The upper infeed-side sprocket is the sprocket 42 connected to the shaft of the feed drive roller 38. The upper outfeed-side sprocket 94 is connected to the shaft 96 that drives the two drive rollers 86, 88 of the rolling mechanism 84. The sprocket 108 at the lower outfeed-side corner of the drive chain 44 is an idler. A tensioning device 109 adjusts the tension of the drive chain 44 by pivoting the shaft of the idler sprocket 108.

The operation of the machine 2 is simple, easy, and efficient. A single operator can cut and roll in the order of at least thirty 100-foot rolls a day, with time out for lunch and breaks. (This includes loading and reloading the machine 2 and boxing the finished pieces.) The operation is as follows.

A roll 10 of lagging 8 is placed in the loading rack 14. The operator pulls pressure roller 26 out of engagement with guide roller 28 against the force of the springs 34. He then pulls the end of the roll up between the pressure roller 26 and guide roller 28 around the guide roller 28 and into engagement with the second pair of rollers 36, 38. It is not necessary to exert much force to sufficiently engage the end of the lagging 8 with the rollers 36, 38.

Before starting the motor 104 to turn the drive rollers 38, 86, 88, the operator makes sure that the machine 2 is set for manual operation. (A red light R on the top of the control box 112 lights up when the machine 2 is in its manual mode.) He then flips the spring loaded toggle switch 110 on the top of the control box 112 forward to start the drive roller 38 in the forward direction to feed the lagging 8 into the machine 2. The operator holds the toggle switch 110 in the forward position until the outfeed end of the lagging 8 has moved past the cutting station of the cutting apparatus. He then releases the toggle switch 110 which returns to its center off position and the motor 104 stops to stop the rotation of the drive rollers 38, 86, 88. The motor 104 is provided with an electronically activated disc brake on its drive shaft 106 to stop the motor 104 essentially instantaneously when the toggle switch 110 returns to its off position. The brake is the same type as the brake on motor 76. With the drive motor 104 stopped, the operator presses the shear button 114 on the control box 112, activating the shear motor 76 to make one revolution and shear off the outfeed end of the lagging 8. As the end is sheared off, the break or hug edge 6 described above is formed on the new outfeed end of the lagging 8 which will become the first finished piece 4. This initial manual operation is necessary to form the hug edge 6 on the first piece and to insure that the edge of the first piece is straight. Rolls of lagging direct from the factory frequently have rough or uneven edges.

After the first edge on the first piece of lagging 8 has been formed by manual operation of the machine 2, the operator sets the machine 2 for the length of pieces to be cut and the quantity of pieces. He also makes sure that the diameter setting pressure roller 90 is set at the correct tension to produce the desired diameter of the finished pieces 4 of lagging. The operator then sets the machine for the automatic mode (in which green light G on the top of control box 112 lights up) and presses the start button 116. Once the machine 2 has been started in its automatic mode, all that remains for the operator to do is to stand at the outfeed end of the machine 2 and remove the completed pieces 4. The completed pieces 4 could be allowed to drop into a container, but this is generally undesriable since most metal lagging in common use will easily dent.

During operation of the machine 2 in the automatic mode, the metal lagging 8 is drawn by the feed drive roller 38 up from the loading rack 14, between the guide and pressure rollers 28, 26, and between the drive and pressure rollers 38, 36. As noted above, the passage of the lagging 8 between the guide and pressure rollers 28, 26 and up and around the guide roller 28 keeps the lagging 8 from wandering and removes the memory of the curvature of the roll 10 from the metal. The drive roller 38 moves the end of the lagging 8 on its outfeed side toward and past the cutting station of the cutting apparatus. The guide block 58 guides the lagging 8 into the correct position with respect to the cutting station. When the lagging 8 has proceeded far enough past the cutting station to form a piece of the desired length, a linear counter L on the control box 112 signals the drive motor 104 to stop and thereby stop the rotation of the drive rollers 38, 86, 88. The electronically activated brake on the drive motor 104, as noted above, stops the drive motor almost instantaneously so that the length of the piece of lagging 8 is very accurately measured. Once the drive motor 104 has stopped the shear drive motor 76 is activated to complete one revolution to shear the lagging 8 as described above. As the lagging 8 is being cut, the hug edge 6 on the next piece of lagging is formed by the cooperation of the pressure foot 54 and guide block 58, also as described above. When the movable blade 46 returns to its upper position (shown in FIG. 3), it contacts a limit switch 118 that signals the control box 112 to restart the drive motor 104 to recommence the rotation of the three drive rollers 38, 86, 88. The limit switch 118 is of the type manufactured by Square "D" of Los Angeles, Calif., with Model No. 9007.

Before its infeed end is severed from the next piece by the cutting blades 46, 48, the outfeed end of each piece of lagging 8 is fed by the feed drive roller 38 into engagement with the nip of the two drive rollers 86, 88 of the curling mechanism 84. Since the rotation of the three drive rollers 38, 86, 88 is carefully synchronized, the feeding of the lagging 8 by drive roller 38 into engagement with drive rollers 86, 88 is performed smoothly and accurately with no tugging on the lagging 8 by the two drive rollers 86, 88 of the curling mechanism 84 and no buckling of the lagging 8 between the feed drive roller 38 and the two drive rollers 86, 88 of the curling mechanism 84. As the outfeed end of the lagging 8 moves beyond the cutting station in the outfeed direction, it contacts guide plate 100 which guides it to the nip between the two drive rollers 86, 88. Once engaged in the nip of the two drive rollers 86, 88, the lagging 8 is drawn through the two drive rollers 86, 88 and has the desired curvature imparted to it by the pressure of diameter setting roller 90 against the upper drive roller 86. The outfeed end of the piece of lagging 8 moves out from engagement with the three rollers 86, 88, 90 of the curling mechanism 84 and contacts the guide plate 98. When the infeed end of the piece of lagging 8 has moved out from engagement with the curling mechanism 84, the rolled piece 4 simply falls off the machine 2 into the hands of the operator. Of course, since the three drive rollers 38, 86, 88 are synchronized, as one piece of lagging 8 is being rolled the next piece of lagging 8 is being moved beyond the cutting station toward engagement with the curling mechanism 84. Thus, the output of the machine 2 is maximized since the progress of the lagging 8 through the machine 2 is stopped only very briefly for the cutting operation.

The face of the control box 112 is most clearly shown in FIG. 10. The spring loaded toggle switch 110 for manual operation of the machine 2 projects upwardly from the top of the control box 112. The toggle switch 110 has three positions, its center off position into which it is spring biased, its forward position described above, and an opposite reverse position. The operator moves the toggle switch 110 into the reverse position to rotate the drive rollers 38, 86, 88 in the reverse direction should there be any need to move the lagging 8 back toward the loading rack 14.

The front vertical face of the control box 112 has three buttons on its upper portion. As shown in FIG. 10, the button on the left is a push button 114 for manually activating the shear drive motor 76, the button 120 in the middle has three settings to set the mode of operation of the machine 2, and the button on the right is a push button 116 for starting the automatic operation of the machine 2. The three modes of operation of the machine 2 controlled by the center button 120 are, moving clockwise, manual, off, and automatic. The operator turns the center button 120 to the position corresponding to the desired mode of operation of the machine 2.

On the lower portion of the face of the control box 112, two digital counters Q, L are mounted. Each of these counters Q, L is of a conventional type and is plugged into a suitable opening in the control box 112 with suitable electrical connections. Each counter Q, L has conventional dials for setting the quantity desired, which dials are easily accessible to the operator. The counter Q on the left of FIG. 10 is a quantity counter of the type manufactured by Eagle Signal Industrial Controls of Davenport, Iowa, with Model No. DZ100. Preferably, counter Q may be set from 0 to 99. As each piece 4 of lagging 8 is cut and rolled, the quantity indicated counts down. When the quantity indicator reaches 0, the machine 2 is automatically shut down. The counter L on the right of FIG. 10 determines the length of the pieces of lagging cut and rolled by the machine 2. In the preferred embodiment of the invention, the counter L is a four digit timer of the type manufactured by Eagle Signal Industrial Controls, with Model No. CT531. The speed of the drive motor 104 has very little variation so that, for each individual machine, the number of inches of lagging 8 moving past the cutting station per second of operation can be very accurately determined. Once the number of inches per second is determined, a chart of inches to seconds may be drawn up so that the timer may be quickly and easily set for any desired length for each piece of lagging.

Of course, the measuring of the pieces of lagging into the desired length could also be accomplished by other means. For example, a sensor could be provided to count the number of teeth on one of the sprockets 42, 94, 102, 108 that pass a particular point. The number of teeth passing the particular point could be correlated with the number of inches of lagging 8 moving past the cutting station in the same manner that the length of time passed can be correlated with the number of inches. An example of a sensor that could be used is the sensor sold under the trademark Rechner with the Model No. 1AS6012SM12, which could be used with an Eagle Signal Industrial Controls counter, Model No. CT511. The preferred embodiment of the invention uses a timer to measure the length of the pieces because of its high reliability and very great accuracy.

The preferred embodiment of the invention offers many significant advantages over previously known machines for cutting and rolling sheet materials such as metal lagging. The machine 2 is extremely accurate, operates efficiently, requires a relatively small amount of floor space, and provides great savings in labor. The floor space required by the preferred embodiment of the machine 2 is only about five feet by five feet. The machine 2 requires a maximum of ½ horse power in electricity and no other power source for its operation. The machine 2 can process a hundred foot roll of lagging in approximately nine minutes. Only one person is required to operate the machine 2 and the amount of work that the single operator of the machine 2 is required to do is minimal.

The machine 2 also has the very great advantage of completely automatically performing a number of functions. The performance of these functions by use of previously known machines requires the use of more than one machine and the performance of some of the steps by manual labor. By employing the machine 2 of the invention, a roll 10 of metal lagging may be loaded onto the loading rack 14 direct from the factory with the vapor barrier of the lagging rolled inward of the metal of the lagging. The lagging is automatically fed into the machine 2, is straightened to remove the memory of the curvature of the roll 10, is cut into the desired length, has the hug edge 6 formed on it, is rolled into a cylinder 4 of the desired diameter, and leaves the machine 2 with the vapor barrier in the correct position on the inner circumference of the finished piece 4 of lagging, all without human intervention. In short, a roll of lagging straight from the factory is loaded onto the machine 2, the machine 2 is started, and the completely finished product automatically exits the machine 2. In addition to the quick and efficient production of the finished product, the machine 2 provides an extremely accurate and high quality finished product.

It will be obvious to those skilled in the art to which this invention is addressed that the invention may be used to advantage in a variety of different situations. Therefore, it is also to be understood by those skilled in the art that various changes, modifications, and omissions in form and detail may be made without departing from the spirit and scope of the present invention as defined by the following claims.

What is claimed is:

1. Apparatus for forming sheet metal sleeves, comprising:

a frame; and feed means, edge forming and cutting means, and roll forming means, in series:

said edge forming and cutting means comprising a vertically movable cutter blade and a vertically movable first forming member adjacent to said blade;

said roll forming means including a plurality of rollers forming a nip into which sheet metal to be formed is received;

said feed means being positioned to pull sheet metal from a roll and feed it below the cutter blade and first forming member when they are in a raised position, to and into the nip of the roll forming rollers;

said edge forming and cutting means further comprising a fixed second forming member so positioned and shaped that, when the first forming member and the cutter blade are lowered, the first forming member will engage the sheet metal and urge it against a portion of the second forming member to crease the sheet metal and then the cutter blade will cut the sheet metal along a line close to the crease; and said feed means further comprising a loading rack attached to a lower portion of the infeed end of the frame for supporting a roll of uncut sheet metal; a first pair of feed rollers supported on the infeed end of the frame above and on the outfeed side of the roll of sheet metal, said rollers including a pressure roller and a guide roller positioned on the outfeed side of the pressure roller with the axis of the pressure roller being slightly below the axis of the guide roller; biasing means for biasing the pressure roller toward the guide roller; a second pair of feed rollers supported on the frame on the outfeed side of the first pair of rollers and positioned to have lines of contact with the sheet metal that are below the uppermost portion of the guide roller of the first pair of rollers; and means for guiding the sheet metal into position to be cut by the edge forming and cutting means; said first and second pairs of feed rollers being positioned to pull the sheet metal up from under the outfeed side of the roll and to roll the sheet metal in a direction opposite to the curvature of the roll to remove memory of the curvature of the roll.

2. Apparatus as described in claim 1, which further comprises means for coordinating operation of the feed means, the edge forming and cutting means, and the roll forming means; said means for coordinating comprising a motor, and a drive chain driven by said motor, said drive chain engaging one of the second pair of rollers of the feed means and two of the rollers of the roll forming means forming said nip to synchronize the feed means and the roll forming means to ensure smooth feeding of the sheet metal into said nip by the feed means.

3. Apparatus for forming sheet metal sleeves, comprising:

feed means, edge forming and cutting means, and roll forming means, in series:

said edge forming and cutting means comprising a vertically movable blade having a cutting edge, and a vertically movable first forming member adjacent to said blade;

said roll forming means including a plurality of rollers forming a nip into which sheet metal to be formed is received;

said feed means being adapted to pull sheet metal from a roll and feed it below the movable blade and first forming member when they are in a raised position, to and into the nip of the roll forming rollers; and said edge forming and cutting means further comprising a stationary blade having a cutting edge that cooperates with the cutting edge of the movable blade to cut the sheet metal, and a fixed second forming member positioned on the infeed side of and generally parallel to and laterally spaced from said cutting edges; said second forming member having guide surface means that slopes downwardly toward the cutting edge of the stationary blade for guiding the sheet metal into position below the movable blade and the first forming member, and a contact surface extending generally downwardly from the outfeed end of the guide surface means; and said contact surface being shaped and positioned so that, when the first forming member and the movable blade are lowered, the first forming member will engage the sheet metal and urge it against said contact surface to crease the sheet metal and then the movable blade will cut the sheet metal along a line close to the crease.

4. Apparatus as described in claim 2, in which the feed means includes straightening means for rolling the sheet metal in a direction opposite to the curvature of the roll to remove memory of the curvature of the roll.

5. In apparatus for cutting metal lagging or the like into pieces of predetermined length, said apparatus being of the type having a stationary blade; a movable blade; two cutting edges, one on each blade, that cooperate to cut the lagging; feed means adapted to pull the lagging from a roll and feed it below the movable blade when the movable blade is in a raised position; and a frame member to support the stationary blade, the improvement comprising:

a pressure foot slidingly attached to the movable blade to reciprocate with the movable blade;

a stationary guide block mounted on said frame member on the infeed side of said blades and positioned generally parallel to and laterally spaced from the cutting edges of the blades; said guide block having guide surface means that slopes downwardly toward the cutting edge of the stationary blade for guiding the lagging into position below the movable blade and the pressure foot, and a contact surface extending generally downwardly from the outfeed end of the guide surface means; and means for reciprocating the movable blade and the pressure foot to first bring the pressure foot into contact with the lagging to urge the lagging against the contact surface of the guide block and the stationary blade adjacent to the cutting edge of the stationary blade to form the lagging into a desired shape, and then to move the cutting edge of the movable blade into contact with the lagging to cut the lagging;

wherein the shapes of the contact surface of the guide block and the portions of the pressure foot that contact the lagging when the pressure foot is so urged conform to said desired shape of the lagging.

6. Apparatus as described in claim 5, further comprising:

frame means which includes said frame member;

a loading rack attached to a lower portion of the infeed end of the frame means for supporting a roll of uncut metal lagging;

a first pair of feed rollers supported on the infeed end of the frame means above and on the outfeed side of the roll of metal lagging, said rollers including a pressure roller and a guide roller positioned on the outfeed side of the pressure roller with the axis of the pressure roller being slightly below the axis of the guide roller;

biasing means for biasing the pressure roller toward the guide roller to grip the metal lagging therebetween; and a second pair of feed rollers supported on the frame means on the outfeed side of the first pair of rollers and the infeed side of said guide surface means, and positioned to have lines of contact with the metal lagging that are below the uppermost portion of the guide roller of the first pair of rollers;

wherein said first and second pairs of feed rollers are positioned to pull the metal lagging up from under the outfeed side of the roll and to roll the metal lagging in a direction opposite to the curvature of the roll to remove memory of the curvature of the roll.

7. In apparatus having cutting means for cutting sheet metal or the like into pieces of predetermined length and a frame for supporting the cutting means, the improvement comprising:

a loading rack attached to a lower portion of the infeed end of the frame for supporting a roll of uncut sheet metal;

a first pair of feed rollers supported on the infeed end of the frame above and on the outfeed side of the roll of sheet metal, said rollers including a pressure roller and a guide roller positioned on the outfeed side of the pressure roller with the axis of the pressure roller being slightly below the axis of the guide roller;

biasing means for biasing the pressure roller toward the guide roller to grip the sheet metal therebetween;

a second pair of feed rollers supported on the frame on the outfeed side of the first pair of rollers and positioned to have lines of contact with the sheet metal that are below the uppermost portion of the guide roller of the first pair of rollers; and means for guiding the sheet metal into position to be cut by the cutting means;

wherein said first and second pairs of feed rollers are positioned to pull the sheet metal up from under the outfeed side of the roll and to roll the sheet metal in a direction opposite to the curvature of the roll to remove memory of the curvature of the roll.

* * * * *

UNITED STATES PATENT AND TRADEMARK OFFICE
CERTIFICATE OF CORRECTION

PATENT NO. : 4,549,422
DATED : October 29, 1985
INVENTOR(S) : Donald A. Harrow

It is certified that error appears in the above-identified patent and that said Letters Patent are hereby corrected as shown below:

Cover page, first word of title, "CUP" should be -- CUT --.
Column 1, first line, "CUP" should be -- CUT --.
Column 2, line 61, "member" should be -- memory --.
Column 3, line 33, "aspect" should be -- subject --.
Column 7, line 36, "is" should be -- its --.
Column 7, line 52, "each" should be -- such --.
Column 10, line 56, "undesriable" should be -- undesirable --.

Signed and Sealed this

Eighteenth Day of March 1986

[SEAL]

Attest:

DONALD J. QUIGG

Attesting Officer

Commissioner of Patents and Trademarks